US009542585B2

(12) United States Patent
Williams et al.

(10) Patent No.: US 9,542,585 B2
(45) Date of Patent: Jan. 10, 2017

(54) EFFICIENT MACHINE-READABLE OBJECT DETECTION AND TRACKING

(71) Applicant: Apple Inc., Cupertino, CA (US)

(72) Inventors: George Williams, Pleasanton, CA (US); Benjamin Olson, Sunnyvale, CA (US); Sebastien Beysserie, Milpitas, CA (US); Ethan Tira-Thompson, San Jose, CA (US); Jianping Zhou, Fremont, CA (US); Claus Molgaard, Los Altos, CA (US); Todd Sachs, Palo Alto, CA (US); Rudolph van der Merwe, Portland, OR (US); Marco Zuliani, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 42 days.

(21) Appl. No.: 13/911,983

(22) Filed: Jun. 6, 2013

(65) Prior Publication Data

US 2014/0363044 A1 Dec. 11, 2014

(51) Int. Cl.
*G06K 7/14* (2006.01)
*G06T 7/00* (2006.01)
(Continued)

(52) U.S. Cl.
CPC ......... *G06K 7/1443* (2013.01); *G06K 7/10722* (2013.01); *G06K 9/3233* (2013.01);
(Continued)

(58) Field of Classification Search
CPC ........... G06T 2207/10016; G06T 5/003; G06T 7/0069; G06T 7/20; G06T 7/2013; G06T 5/004; G06T 2207/30241; G06T 7/0046; H04N 5/145; G06K 9/3241; G06K 2009/3291; G06K 9/00536; G06K 7/1413
(Continued)

(56) References Cited

U.S. PATENT DOCUMENTS 6,044,181 A 3/2000 Szeliski
6,389,179 B1 5/2002 Katayama
(Continued)

FOREIGN PATENT DOCUMENTS

EP 0462905 12/1991
TW 201223271 A 6/2012
WO 2012039307 3/2012

OTHER PUBLICATIONS

International Search Report and Written Opinion received in PCT Application No. PCT/US2013/041088, dated Aug. 6, 2013.

*Primary Examiner* — Vu Le
*Assistant Examiner* — Kenny Cese
(74) *Attorney, Agent, or Firm* — Blank Rome LLP

(57) ABSTRACT

A method to improve the efficiency of the detection and tracking of machine-readable objects is disclosed. The properties of image frames may be pre-evaluated to determine whether a machine-readable object, even if present in the image frames, would be likely to be detected. After it is determined that one or more image frames have properties that may enable the detection of a machine-readable object, image data may be evaluated to detect the machine-readable object. When a machine-readable object is detected, the location of the machine-readable object in a subsequent frame may be determined based on a translation metric between the image frame in which the object was identified and the subsequent frame rather than a detection of the object in the subsequent frame. The translation metric may be identified based on an evaluation of image data and/or motion sensor data associated with the image frames.

19 Claims, 9 Drawing Sheets

(51) Int. Cl.
  *G06T 7/20* (2006.01)
  *G06K 7/10* (2006.01)
  *G06K 9/32* (2006.01)
  *G06K 9/62* (2006.01)

(52) U.S. Cl.
  CPC ... *G06K 9/6203* (2013.01); *G06K 2009/3291* (2013.01); *G06K 2209/21* (2013.01); *G06T 7/004* (2013.01); *G06T 7/20* (2013.01)

(58) Field of Classification Search
  USPC .................................... 382/103, 107, 181
  See application file for complete search history.

(56) References Cited

U.S. PATENT DOCUMENTS

| | | |
|---|---|---|
| 6,618,511 B1 | 9/2003 | Mancuso |
| 7,501,616 B2 | 3/2009 | Wiklof |
| 8,064,719 B2 | 11/2011 | Ozluturk |
| 8,064,720 B2 | 11/2011 | Ozluturk |
| 8,154,607 B2 | 4/2012 | Ozluturk |
| 8,295,547 B1 | 10/2012 | Cangiani |
| 8,331,723 B2 | 12/2012 | Ozluturk |
| 8,335,348 B2 | 12/2012 | Srikrishnan |
| 8,335,400 B2 | 12/2012 | Kobayashi |
| 8,345,102 B2 | 1/2013 | Huang |
| 8,630,484 B2 | 1/2014 | Ozluturk |
| 2003/0133020 A1 | 7/2003 | Suh |
| 2006/0072176 A1 | 4/2006 | Silverstein |
| 2006/0088191 A1* | 4/2006 | Zhang ............... G06K 9/00711 382/107 |
| 2007/0081081 A1 | 4/2007 | Cheng |
| 2007/0285562 A1 | 12/2007 | Raynor |
| 2008/0089552 A1* | 4/2008 | Nakamura ........... G06T 1/0085 382/100 |
| 2009/0208062 A1 | 8/2009 | Sorek |
| 2009/0245573 A1* | 10/2009 | Saptharishi ........ G06K 9/00771 382/103 |
| 2010/0017115 A1 | 1/2010 | Gautama |
| 2010/0020244 A1* | 1/2010 | Mitsuya ................ G06T 7/2026 348/699 |
| 2010/0194852 A1 | 8/2010 | Tseng |
| 2011/0110605 A1 | 5/2011 | Cheong |
| 2011/0228112 A1 | 9/2011 | Kaheel |
| 2011/0304688 A1 | 12/2011 | Ge |
| 2011/0304694 A1 | 12/2011 | Nestares |
| 2011/0310255 A1 | 12/2011 | Medeiros |
| 2012/0194687 A1 | 8/2012 | Ozluturk |
| 2012/0201427 A1* | 8/2012 | Jasinski ................ H04N 5/2327 382/107 |
| 2012/0218427 A1* | 8/2012 | Wu .................... H04N 5/23267 348/208.6 |
| 2012/0268554 A1 | 10/2012 | Gilbert-Schachter |
| 2012/0300019 A1 | 11/2012 | Yang |
| 2013/0033568 A1 | 2/2013 | Kim |
| 2013/0038743 A1 | 2/2013 | Ozluturk |
| 2014/0218470 A1 | 8/2014 | Rondinelli |

* cited by examiner

EFFICIENT MACHINE-READABLE OBJECT DETECTION AND TRACKING

BACKGROUND

This disclosure relates generally to techniques to identify the presence and location of a machine-readable object. More particularly, but not by way of limitation, the disclosure relates to techniques to more efficiently track the location of a machine-readable object in a series of images obtained by an imaging device such as a camera.

For purposes of this specification, a machine-readable object refers to any optically detectable information that is associated with additional data. Common machine-readable objects include 1D and 2D barcodes that are associated with marketing, pricing, or other information. Machine-readable objects may also include images that are associated with additional data. For example, an image of a historical location may be detectable to retrieve information associated with the location. While machine-readable objects were at one time recognizable only by specialized optical scanning systems, many consumer devices that incorporate image capture devices, such as smartphones, PDAs, and tablet computers, are now capable of detecting machine-readable objects in a captured image and retrieving the data with which the machine-readable objects are associated. With the increase in devices capable of detecting machine-readable objects and presenting information associated with the detected objects, the number of applications for machine-readable objects has drastically increased. Machine-readable objects that were once used primarily for associating prices with products to which they were attached can now be used to deliver information such as marketing information, coupons, augmented reality information, and many other types of information directly to consumers.

While the ability of consumer devices to detect machine-readable objects and present information related thereto has led to an increase in the number of applications for machine-readable objects, these consumer devices (e.g., smartphones, tablets, PDAs, etc.) often have relatively limited processing capabilities. Because existing operations to detect and track machine-readable objects are computationally expensive, execution of such operations on consumer devices has certain drawbacks (e.g., battery usage, processing power diverted from other operations, etc.).

SUMMARY

A method to detect and track the location of a machine-readable object in a set of received image frames may include analyzing a first subset of the image frames to determine whether the image frames satisfy certain criteria. The criteria may include measures of image sharpness and frame stability. If one or more image frames from the first subset satisfy the criteria, a second subset of image frames may be analyzed to detect a machine-readable object in one or more of the image frames of the second subset. The first and second subsets may be at least partially overlapping. After a machine-readable object is identified in one or more of the image frames in the second subset, the location of the machine-readable object in a subsequently captured image frame may be determined based on a translation metric between the image frame in which the machine-readable object was detected and the subsequently captured image frame. The translation metric may be determined from motion sensor data associated with the image frames or from image data and may be based on a direct comparison of the image frames or an aggregation of translation metrics between pairs of image frames. The method may be embodied in program code and stored on a non-transitory medium. The stored program code may be executed by one or more processors that are part of, or control, a system that is configured to implement the method.

DETAILED DESCRIPTION

This disclosure pertains to systems, methods, and computer readable media for detecting and tracking machine-readable objects. In general, a device may attempt to identify an appropriate time at which to begin evaluating digital image frames to identify a machine-readable object. After an object is located, the location of the object may be tracked using operations that are more efficient than continuously attempting to detect the object in subsequent image frames.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of image processing having the benefit of this disclosure.

Figure 1:
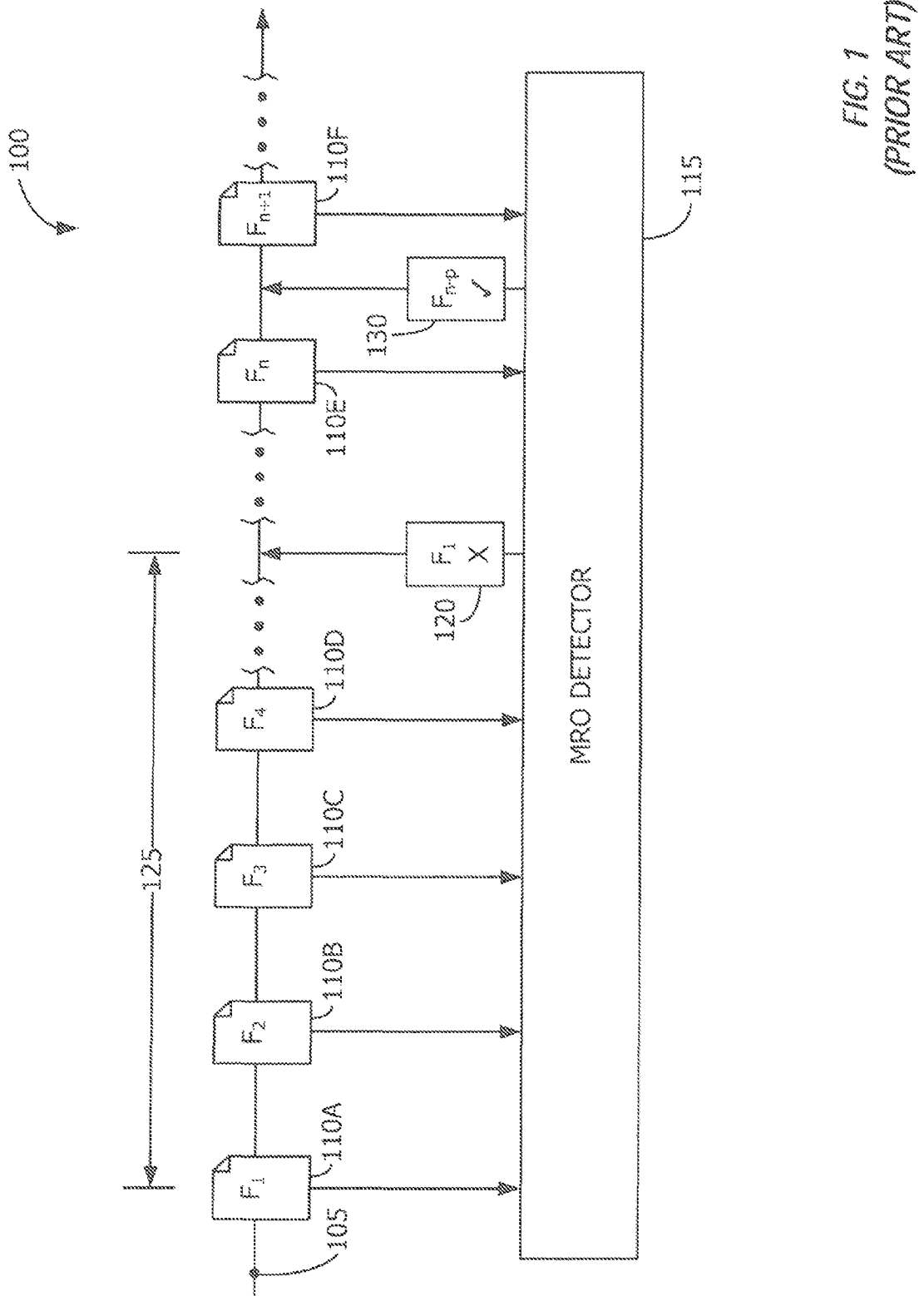
FIG. 1 illustrates a block diagram representing a common existing machine-readable object detection operation.

Referring to FIG. 1, existing operation 100 to detect and track machine-readable objects may begin with a request to detect a machine-readable object (105). Request 105 may be received in response to a user launching an application that is configured to identify a particular type of machine-readable object (e.g., 2D barcodes, etc.). Such an application may initialize an image capture device to begin capturing digital image frames 110 at a specified frame rate. Each captured image frame may then be submitted to machine-readable object detector 115. Object detector 115 may be implemented as a computer program module. Object detector 115 may analyze each image frame to identify one or more regions of interest within the image frame that include known properties of the machine-readable object that detector 115 is designed to detect. For example, object detector 115 may identify regions within an image frame that have properties associated with a 2D barcode.

Object detector 115 may return results indicative of the presence of the specified type of machine-readable object within a particular evaluated image frame. In the illustrated embodiment, object detector 115 may return result 120 indicating that no machine-readable object was detected in image frame 110A. It may be common for a first series of frames captured after a request to detect a machine-readable object not to contain the object. For example, a request to detect a machine-readable object may be received in response to a user launching an application to detect such an object. When the user launches the application, it is likely that the image capture component of the device is not directed toward an article that contains the machine-readable object (e.g., magazine page, etc.). Until the image capture device is directed towards the article that contains the machine-readable object such that the object is captured in subsequent image frames, the object cannot be detected by object detector 115. There may also be a time delay 125 between the time at which an image frame is provided to object detector 115 and the time at which the results are presented by object detector 115. When object detector 115 detects a machine-readable object in one of frames 110, result 130 may be provided to indicate a region of the image in which the object was detected. In one embodiment, the region of interest may be provided in terms of coordinates that identify the location of the object. Result 130 may also include information related to the detected object. In one embodiment, the information may include a uniform resource locator (URL) and an identifier for the detected object to enable retrieval of additional information associated with the object.

In some applications, it may be important to continue to track the location of the detected object. In one embodiment, the content related to the detected object may be overlaid on captured image frames 110 and the presentation of the content may be dependent on a location of the detected object. In such an embodiment, the presentation of content may be a function of both an identifier of the detected object and the location of the detected object in an image frame. As the location of the detected object within an image frame may vary, image frames may be provided to object detector 115 even after a machine-readable object is detected in a prior image frame. For example, image frame 110F may be provided to object detector 115 after positive result 130.

As is known by those of ordinary skill in the art, the detection of an object within an image involves relatively complex operations. For example, the detection of an object may involve the analysis of various portions of the image data (corresponding to different spatial portions of the image) using a series of filters of different sizes and orientations in order to detect a specified object regardless of its potential properties in the image (e.g., its orientation, size, etc.). Therefore, the operations performed by object detector 115 are significantly demanding in terms of processing resources.

Figure 2:
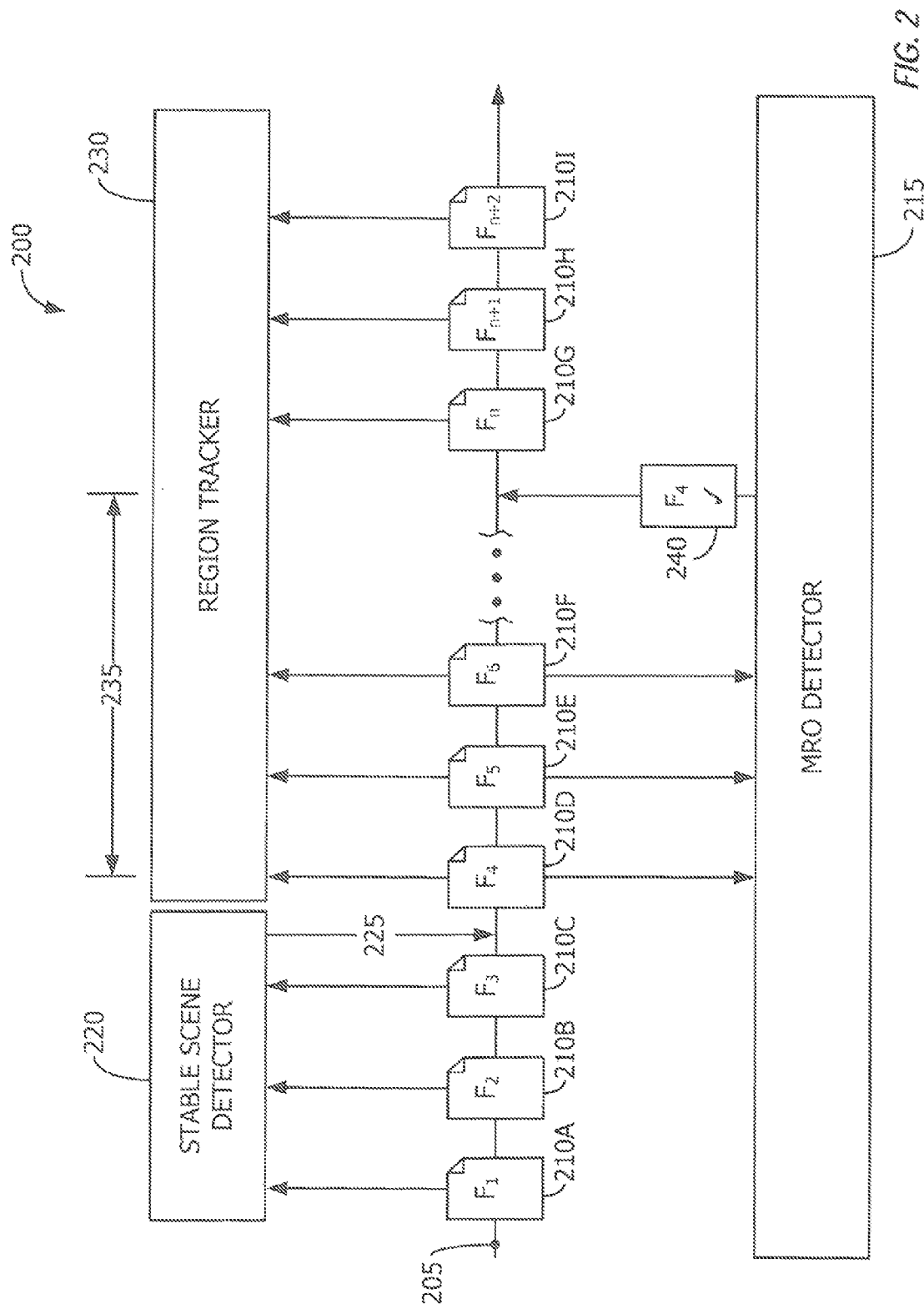
FIG. 2 illustrates a block diagram representing an improved machine-readable object detection and tracking operation in accordance with one embodiment.

Referring to FIG. 2, in an effort to minimize the computationally demanding operations performed by object detector 215, in accordance with operation 200 image frames 210 may initially be provided to stable scene detector 220 in response to request 205 to detect a machine-readable object. In one embodiment, stable scene detector 220 may evaluate properties of digital image frames 210 to determine whether it may be likely that a machine-readable object could be detected within the frames 210. When the evaluated image properties indicate that the image is blurry or that the depicted scene is changing rapidly from frame-to-frame, it may be determined that it is a waste of processing resources to submit image frames to object detector 215. Conversely, when the evaluated image properties indicate that the image is sharp and that the depicted scene is relatively stable frame-to-frame, it may be determined that the evaluated image frames 210 (or subsequently captured image frames 210 as illustrated in FIG. 2) should be submitted to detector 215 in an attempt to identify a machine-readable object in the captured frames 210. Stable scene detector 220 may be implemented as a computer program module that is less computationally demanding than object detector 215. Accordingly, pre-evaluation of captured image frames 210 using stable scene detector 220 may avoid the unnecessary usage of processing resources by object detector 215 when it is unlikely that any machine-readable object will be detected in an image frame.

Stable scene detector 220 may use one or more of a variety of different image frame properties to evaluate an image frame's sharpness and the frame-to-frame stability of a depicted scene. In one embodiment, image data may be evaluated using a pixel sum technique to determine whether a depicted scene is stable frame-to-frame. One pixel sum technique may add pixel values (e.g., luminance values) for individual rows and columns in a given image frame to yield two one dimensional arrays that represent a signature of the image frame. The relative frame-to-frame motion of a depicted scene may be determinable based on a comparison of these signatures for different image frames. For example, image frames having similar signatures will likely depict substantially similar scenes whereas image frames having dissimilar signatures will likely be indicative of motion between frames. When a signature difference between two image frames satisfies a predefined threshold, it may be determined that a depicted scene is stable frame-to-frame. Pixel sum techniques will be described in greater detail below with reference to tracking the location of a detected machine-readable object from frame-to-frame. In the context of stable scene detection, however, it may be possible to recognize gross frame-to-frame motion without the precision required for machine-readable object tracking described below. For example, gross frame-to-frame motion may be identifiable with fewer signature components (e.g., fewer rows/columns may be evaluated). In addition to the usage of image data to determine frame-to-frame motion, image data may be evaluated using known techniques to determine the sharpness of an image frame.

In another embodiment, stable scene detector 220 may evaluate image sharpness based on metadata that represents auto-focus (AF) and/or auto-exposure (AE) settings that are associated with individual image frames 210. AF and AE settings may be specific to an image frame as a whole or may apply to different regions of an image frame. Evaluation of the AF and AE settings may provide information about the sharpness of the image frame with which the settings are associated. In addition, AF and AE settings may be used to evaluate scene stability. For example, when AF and AE settings change from frame-to-frame, it may be determined that the depicted scene is not stable.

In yet another embodiment, stable scene detector 220 may utilize motion data that corresponds to an image frame capture time to analyze scene stability. Many mobile devices that include image capture components also include motion sensors such as accelerometers and/or gyroscopes. Data obtained by such sensors at substantially the same time as an image frame is captured can provide valuable information regarding the orientation and motion of a camera at the time an image frame is captured. While image capture device motion is only one component of scene stability (scene motion being the other), because a scene that includes a machine-readable object may typically be static, it may be determined that an image frame depicts a stable scene when the motion data associated with the image frame satisfies a predefined threshold. Stable scene detector 220 may employ any of the above-mentioned techniques in any combination as well as any other techniques that may enable evaluation of image blur and scene stability.

When it is determined that image frames 210 satisfy requisite scene stability and/or sharpness metrics, result 225 may be provided by stable scene detector 220. In the illustrated embodiment, after stable scene detector 220 provides result 225, subsequent captured frames may be provided to object detector 215. In an alternate embodiment, one or more of the most recent image frames that were evaluated by stable scene detector 220 (e.g., the image frames that contributed to result 225), may also be provided to object detector 215. In one embodiment, upon receiving result 225, a group of image frames may be provided to object detector 215. For example, 10 image frames captured after result 225 may be provided to object detector 215. Although FIG. 2 illustrates frames being provided directly to object detector 215 and/or region tracker 230 after the detection of a stable scene, in one embodiment, frames may continue to be evaluated by stable scene detector 220 even after the detection of a stable scene. For example, if a scene becomes unstable after a stable scene was previously detected, it may be desirable to discontinue detection and/or tracking operations. In such an embodiment, the frequency with which frames are sent to object detector 215 may be decreased (i.e., a decreasing percentage of the captured frames may be sent to object detector 215) as time elapses if no object is detected and the scene remains stable as it is unlikely that a machine-readable object may be gradually introduced into a stable scene. In response to the detection of an auto-exposure or auto-focus event by stable scene detector 220 (e.g., after detection of a new focus position or exposure setting), the frequency with which frames are sent to object detector 215 may be increased (i.e., an increasing percentage of the captured frames may be sent to object detector 215) because the new focus or exposure setting may enable the detection of a machine-readable object that was not detected at the old focus or exposure setting. If no machine-readable object is detected at the new settings, the frequency may be again decreased.

When image frames 210 are provided to object detector 215, they may also be provided to region tracker 230. Region tracker 230 may be implemented as a computer program module to track both global image frame motion between an image frame's capture time and the time an object is detected in the image frame (e.g., time delay 235) and to precisely track the location of an object within an image frame after its detection. The functionality of region tracker 230 will be described in greater detail below. When object detector 215 identifies the presence of a machine-readable object in an image frame, it may provide result 240. Result 240 may include an object identifier as well as a location of the object within an image frame. In one embodiment, it may be required that a machine-readable object be detected in multiple image frames before a positive result is returned. For example, it may be required that a machine-readable object be detected in three out of five consecutive image frames before a positive result is provided. Upon receiving result 240, subsequently captured image frames (e.g., frames 210G, 210H, and 210I) may be provided only to region tracker 230 and not to object detector 215. Based on the location of the detected object within an image frame and a value representative of global scene motion since the capture of the frame within which the object was detected (e.g., the global scene motion during time delay 235), the location of the detected object within a most recently captured image frame can be identified. By providing subsequently captured image frames to region tracker 230, the change in location of the detected object within the subsequently captured image frames can be identified without performing the computationally expensive object detection for every frame. Different techniques for tracking the location of a detected object will be described in greater detail below. In one embodiment, image frames may periodically be provided to object detector 215 in order to verify an object's location as determined by region tracker 230. For example, every 100$^{th}$ image frame may be provided to object detector 215 to verify the tracked location of an object with its detected location. Because operation 200 minimizes the number of frames that need to be evaluated by object detector 215, machine-readable objects may be detected and tracked in a more computationally efficient manner.

Figure 3:
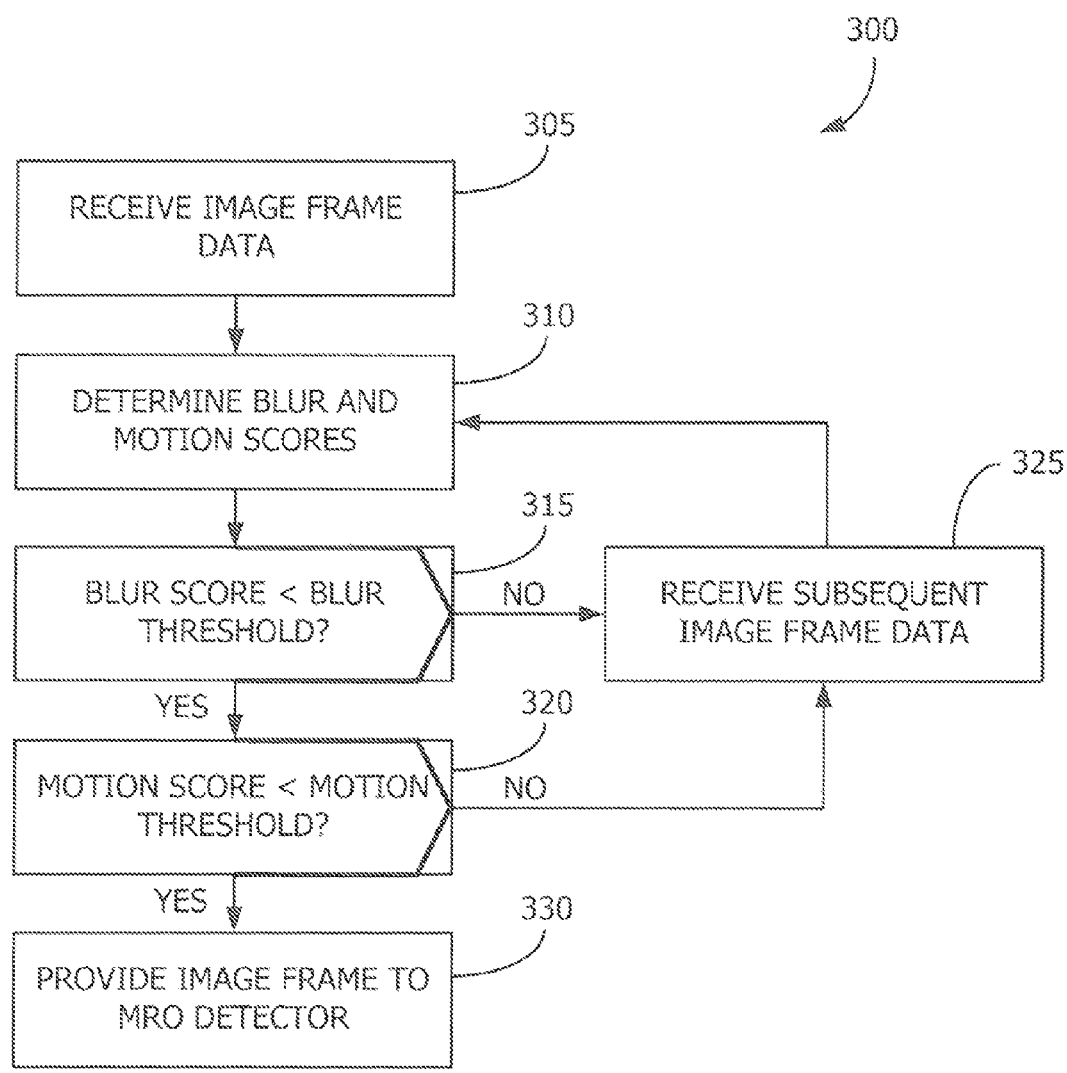
FIG. 3 illustrates an image frame pre-evaluation operation in accordance with one embodiment.

Referring to FIG. 3, pre-evaluation operation 300 (e.g., an operation performed by stable scene detector 220) may begin with the receipt of frame data for a captured image frame (block 305). Pre-evaluation operation may be implemented by a stable scene detector (e.g., a computer program module executing instructions to evaluate image sharpness and scene stability). The captured image frame may be a first image frame after a request to detect a machine-readable object. The received image frame data may include image data, image metadata, device data corresponding to a capture time of the image frame, any additional data that enables an evaluation of the sharpness and/or scene stability of the image frame, or any combination of such data.

Using the received image frame data, blur and motion scores for the image frame may be determined (block 310). As described above with respect to FIG. 2, the sharpness and frame-to-frame stability of a depicted scene can be determined using multiple types of data (e.g., image data, auto-focus and auto-exposure data, motion sensor data, etc.). Using the described data and/or any other types of data that enable an evaluation of image sharpness and frame-to-frame scene stability, blur and motion scores may be determined for the received image frame data. In one embodiment, a high blur score may represent an image with a high amount of blur (i.e. low image sharpness). Similarly, a high motion score may represent a large amount of motion between image frames (i.e., low frame-to-frame stability). In one embodiment, a calculated motion score may represent motion with respect to an earlier-captured image frame. In such an embodiment, the determination of a motion score may require image frame data for more than a single image frame (i.e. the motion scorer may not be determinable for first image frame data alone). After blur and motion scores are calculated for received image frame data, these scores may be compared to a blur threshold and a motion threshold, respectively (blocks 315 and 320). In the depicted embodiment, if the blur score is less than a blur threshold and the motion score is less than a motion threshold (the "Yes" prongs of blocks 315 and 320), then an image frame is provided to an object detector to identify the presence and location of a machine-readable object within the image frame (block 330). In one embodiment, the image frame provided to the object detector may be the image frame corresponding to the evaluated frame data. In another embodiment, the it age frame provided to the object detector may be an image frame captured after it is determined that the evaluated image frame data satisfies the blur and motion thresholds. If either the blur score exceeds the blur threshold or the motion score exceeds the motion threshold (the "No" prongs of blocks 315 and 320), image frame data for a subsequently captured image frame may be received (block 325). The image frame data for the subsequently captured image frame may then be evaluated to determine a blur score and motion score (block 310). In one embodiment, operation 300 may continue until received image frame data results in a blur score and a motion score that satisfy the blur threshold and motion threshold.

While the illustrated embodiment depicts the provision of an image frame to the object detector when it is determined that the evaluated frame data results in blur and motion scores that are less than the blur and motion thresholds, in another embodiment, the blur and motion scores and thresholds may be configured such that the image frame is provided to the object detector when the scores exceed the thresholds. In such an embodiment, the blur and motion scores and thresholds may be referred to as sharpness and scene stability scores and thresholds. Pre-evaluation operation 300 may conserve processing resources by avoiding the unnecessary provision of image frames that are unlikely to contain a detectable machine-readable object to a computationally expensive object detector.

Figure 4:
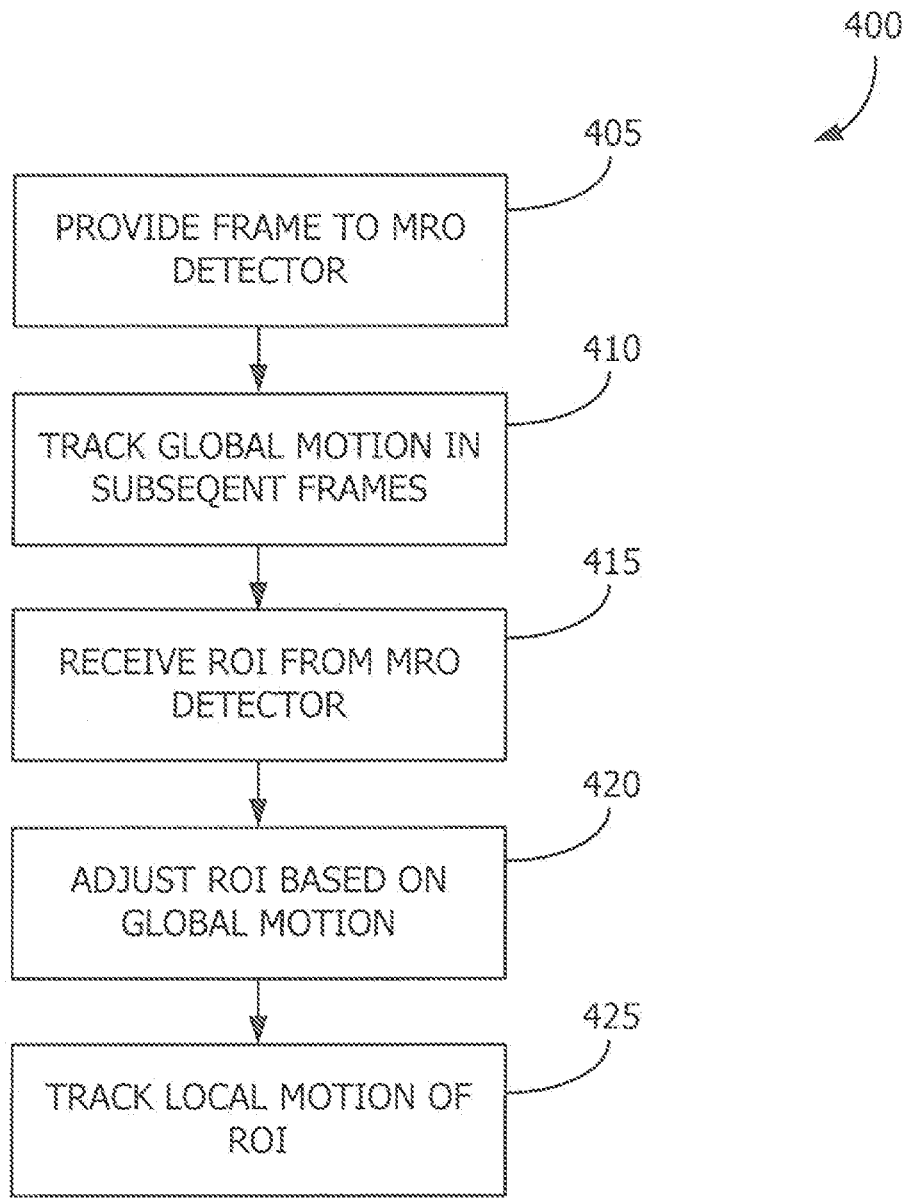
FIG. 4 illustrates a machine-readable object tracking operation in accordance with one embodiment.

Referring to FIG. 4, tracking operation 400 (e.g., a tracking operation performed by region tracker 230) may begin with the provision of an image frame to a machine-readable object detector (block 405). After the image frame is provided to the object detector, global frame-to-frame motion of a scene depicted in the image frame may be tracked in subsequent image frames (block 410). As will be described in greater detail below, global frame-to-frame motion may be determined based on an evaluation of image data or based on an evaluation of notion sensor data. In one embodiment, frame-to-frame motion of a depicted scene may be expressed in terms of a two dimensional translation between two consecutive image frames of a common point depicted in the image frames. When an object is detected in the image frame provided to the object detector, the location of a region of interest that contains the detected object may be received (block 415). The region of interest may be expressed in terms of coordinates of the image frame within which the object was detected. For example, the location of corners of the region of interest may be expressed in terms of coordinates that define a horizontal and vertical pixel offset from a reference point for the image frame. Based on the location of the region of interest in the image frame in which the object was detected and the known global motion of a depicted scene between such image frame and a most recently captured image frame, the received region of interest location may be adjusted to correspond to the location of the region of interest in the most recently captured image frame (block 420). In one embodiment, the global motion used to adjust the location of the region of interest may correspond to the aggregation of the frame-to-frame motion for each pair of consecutively captured image frames from the frame in which the object was detected to the most recently captured image frame. Using the adjusted region of interest location in the most recently captured image frame, the location of the region of interest may be tracked based on the local frame-to-frame motion of the area corresponding to the region of interest (block 425). In one embodiment, the local region of interest tracking may differ from the global motion tracking in that global motion tracking may focus on the image as a whole whereas the local tracking may focus on the portion of the image frame that contains the detected object. Tracking operation 400 may conserve processing resources by tracking the location of a machine-readable object using a computationally efficient tracking operation instead of a computationally expensive detection operation.

Figure 5:
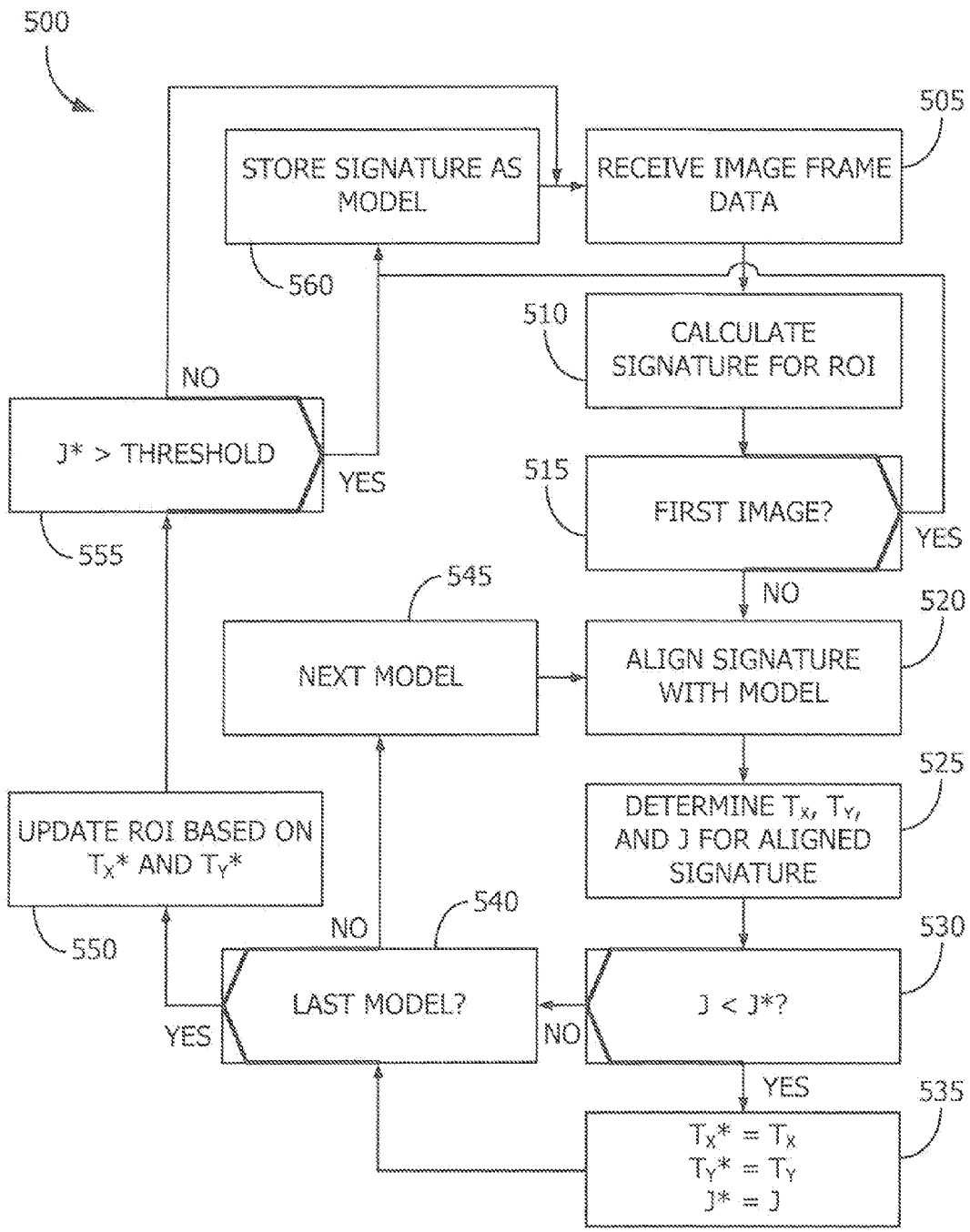
FIG. 5 illustrates an image data-based machine-readable object tracking operation in accordance with one embodiment.

Referring to FIG. 5, image data tracking operation 500 may begin with the receipt of image frame data (block 505). The image frame data may include some or all of the visual data captured by a photo sensor of the image capture device. In one embodiment, the image frame data may include a compressed version of the image frame data captured by the photo sensor. In another embodiment, the image frame data may include modified image data. For example, the received image frame data may include only the luminance values for image pixels.

Using the received image frame data, a signature may be calculated for a region of interest (block 510). Although referred to singularly as a signature, each signature may comprise multiple sets of values. The region of interest may vary based on the specific application. For global frame-to-frame scene motion tracking, the region of interest may be the entire image. For local tracking of a detected machine-readable object, the region of interest may be only a specified subset of the image data that represents the spatial location of an area that contains the detected object. In one embodiment, a signature may be calculated from a projection that includes a first set of values corresponding to the summation of pixel values for rows of the region of interest and a second set of values corresponding to the summation of pixel values for columns of the region of interest. In such an embodiment, the two projection sets of values may be calculated according to the following equations:

$$\pi_c(x) = \sum_{r=0}^{height-1} P(r, x) \quad (1)$$

$$\pi_r(y) = \sum_{c=0}^{width-1} P(y, c) \quad (2)$$

For each row and column in the region of interest (or for a certain subset of the rows and columns), the projection includes a value equal to the sum of the pixel values for that row or column. The projection sets of values may then be processed to obtain a signature. For example, in one embodiment, the projection sets of values may be smoothed with a box filter and the 1-D gradient of the smoothed sets of values may be computed to determine the signature sets of values. In another embodiment, the projection sets of values may not be further processed. In such an embodiment, the projection sets of values may be equivalent to the signature sets of values. After the signature is calculated for the region of interest, it may be determined if any signature has been calculated for the region of interest for previous image frame data (block 515). If no signature has been calculated for the region of interest for previous image frame data (the "Yes" prong of block 515), the signature may be stored as a model signature (referred to hereafter as simply the "model") (block 560). If, on the other hand, a signature has been calculated for the region of interest for previous image frame data (the "No" prong of block 515), the calculated signature may be aligned with a first model (block 520). As will be described below, the models provide signatures for different versions of a tracked object (e.g., different orientations of a machine-readable object within the region of interest). By comparing a signature for a region of interest to the model signatures, the change in location of the tracked object can be determined.

Figure 6A:
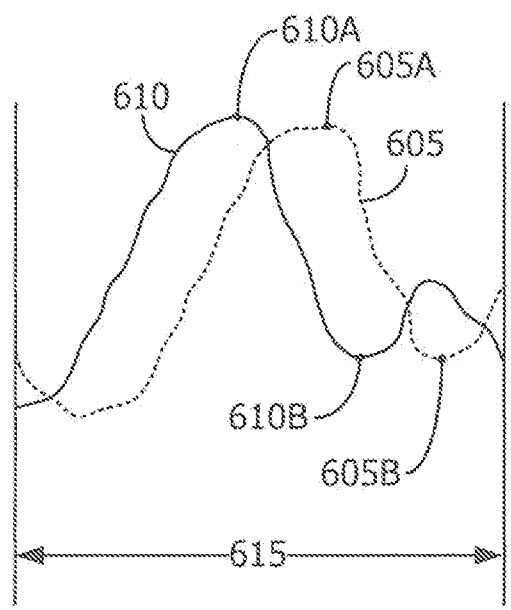
FIGS. 6A and 6B illustrate portions of the image data-based machine-readable object tracking operation of FIG. 5 in accordance with one embodiment.

Alignment of the row value set for the signature with the row value set for the model and alignment of the column value set for the signature with the column value set for the model may be performed separately to determine the translation of the region of interest in the horizontal and vertical directions. Referring to FIG. 6, an example set of values (either row or column values) for a signature 605 and a model 610 are illustrated. It will be recognized that signature values 605 and model values 610 are in large part similar. For example, value 605A corresponds roughly to value 610A and value 605B corresponds roughly to value 610B. The offset between these corresponding pairs of points is attributable to the frame-to-frame displacement of the region of interest. The offset between corresponding values for sets of row values corresponds to a vertical displacement of the region of interest while the offset between corresponding values for sets of column values corresponds to a horizontal displacement of the region of interest. In order to determine the value of the offset, a matching cost (J) can be calculated by sliding the signature relative to the model and evaluating their similarity. In one embodiment, the matching cost may be expressed as:

$$J = \frac{\|\pi - \pi'\|}{\|\pi\| + \|\pi'\|} = \frac{\sqrt{\sum_{n=0}^{N-1}(\pi_n - \pi'_n)^2}}{\sqrt{\sum_{n=0}^{N-1}(\pi_n)^2} + \sqrt{\sum_{n=0}^{N-1}(\pi'_n)^2}} \quad (3)$$

where $\pi$ is equal to the signature set of values, $\pi'$ is equal to the model set of values, and N is equal to the number of samples in overlapping portion 615 of the sets of values. The matching cost J can be determined for various values of displacement (z) of the signature relative to the model. The horizontal and vertical displacement of the region of interest can be determined from the displacements (z) that minimize the matching cost for the row and column sets of values respectively. In one embodiment, the determination of the displacement (z) that minimizes the matching cost may be simplified by normalizing the respective value sets (i.e. the signature and model value sets). The matching cost function can then be rewritten as $$J(z) = \sqrt{\frac{\sigma(z)\sigma'(z) - \gamma(z) + \mu(z)\mu'(z)}{2\sigma(z)\sigma'(z)}} \quad (4)$$

where $\sigma(z)$ and $\sigma'(z)$ represent the standard deviation of $\pi(z)$ and $\pi'(z)$, respectively, $\mu(z)$ and $\mu'(z)$ represent the mean of $\pi(z)$ and $\pi'(z)$, respectively, and $\gamma(z)$ is defined as $$J(z) = \frac{1}{N}\sum_{i=0}^{N-1}\pi_i\pi'_i.$$

The minimum value of the matching cost (J) can then be determined for the various values of displacement (z). In one embodiment, the matching cost function may include an additional term to penalize large displacement values to account for spurious minima. In such an embodiment, the calculated matching costs may be adjusted as set forth in the following equation:

$$J(z)=J(z)+\lambda|z-\hat{z}| \quad (5)$$

where $\lambda$ is a weighting factor and $\hat{z}$ is a predicted displacement value based on one or more prior frame-to-frame displacement values (and may be set to zero if no prior displacement has been calculated).

Based on the displacement (z) that minimizes the matching cost for each of the row and column value sets, the translation of the region of interest in the horizontal direction ($T_x$) and the vertical direction ($T_y$), as well as the corresponding matching cost (J) may be identified for the aligned signature (block 525). It will be understood that the relationship between the displacement (z) and the corresponding displacement of the region of interest will depend on the number of samples in the signature and model as well as the granularity of the displacement (z) in the matching cost calculation. For example, where the value sets for the signature and model include a value for each row or column and the matching cost is evaluated for a corresponding granularity (i.e. the comparison of the value sets is performed for each pair of overlapping values), the displacement (z) may correspond directly to the displacement of the region of interest. Similarly, where the value sets include values for less than all of the rows or columns in the region of interest and/or where the matching cost is evaluated for less than all of the pairs of overlapping values, the translation of the region of interest may correspond to some multiple of the calculated displacement (z). Although each signature may be associated with two matching cost values (i.e. a matching cost for the aligned row value sets and a matching cost for the aligned column value sets), these individual matching costs may be combined into a single matching cost for the aligned signature, in one embodiment, the individual matching costs may be summed to identify the combined matching cost. In another embodiment, the individual matching costs may be averaged to identify the combined matching cost.

The combined matching cost may then be compared to a "best model" matching cost value (J*) (block 530). The "best model" matching cost value (J*) may initially (i.e. for each new image frame) be set at a high value such that the first model evaluated is identified as the best model. As will be described in greater detail below, multiple models may be compiled during the performance of tracking operation 600. The translation of a region of interest may be estimated for each of the models and the translation associated with the model having the lowest matching cost may be adopted as the translation of the region of interest.

If the matching cost (J) for the current model is lower than the "best model" matching cost (J*) (the "Yes" prong of block 530), the "best model" horizontal and vertical translations and the "best model" matching cost ($T_x^*$, $T_y^*$, and J*, respectively) may be updated to the corresponding values for the current model (block 535). After the "best model" horizontal and vertical translations and matching cost are updated or if the matching cost (J) is higher than the "best model" matching cost (J*) (the "No" prong of block 530) it may be determined whether the current model is the last model (block 540). If the current model is not the last model (the "No" prong of block 540), the next model may be obtained and the signature alignment, determination of the region of interest translation and matching cost, and "best model" value update steps (blocks 520-535) may be repeated for the new model. If, however, the current model is the last model (the "Yes" prong of block 540), the current region of interest may be updated based on the "best model" horizontal and vertical translation values ($T_x$ and $T_y^*$) (block 550). In one embodiment, the region of interest location and the "best model" horizontal and vertical translation values may each be expressed in terms of pixel values. In such an embodiment, the location of the region of interest may be adjusted based on the translation values. In another embodiment, the calculated translation of the region of interest may be "filtered" based on one or more prior locations of the region of interest to smooth the adjustment of the region of interest location. The "best model" horizontal and vertical translation values represent a translation metric between the region of interest location in a prior image frame and the region of interest location in the current image frame.

Figure 6B:
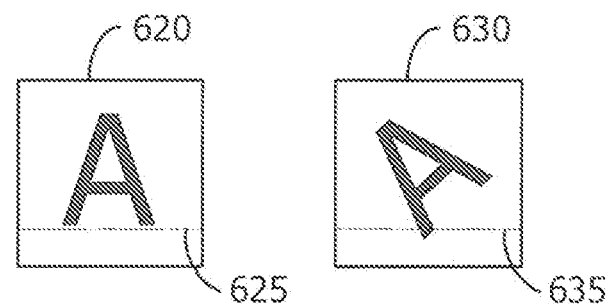

After the region of interest location is adjusted based on the determined translation values, it may be determined whether the "best model" snatching score value exceeds a predefined threshold (block 555). When the "best model" matching score exceeds the predefined threshold, it signifies that, even at the optimal translation values, there is some deviation between the "best model" and the signature for the region of interest in the current frame. This situation may arise, for example, when the orientation of the image capture device is rotated. In such a situation, while the region of interest may depict the same scene as the model, the respective locations of corresponding pixel values may differ. Consequently, the row and column value sets for the signature and the model may differ. As illustrated in FIG. 6B, assume that the letter "A" is a machine-readable object that is being tracked by tracking operation 500. Initially, an image capture device may be oriented such that the letter "A" is oriented upright within the image frame and, consequently, within region of interest 620. The signature calculated for region of interest 620 may be based on pixel values for rows and columns of pixels in region of interest 620. One of the values of a row value set for the signature for region of interest 620 may be defined by the individual pixel values in pixel row 625. As described above, the signature for region of interest 620 may be stored as a model and used to track the location of the region of interest in subsequent frames. However, if the orientation of the machine-readable object (e.g., the letter "A") within an image frame changes as illustrated in region of interest 630, the value for a row value set corresponding to pixel row 635 may be different from the corresponding value for pixel row 625 of region of interest 620. In order to more efficiently track a region of interest that contains a machine-readable object having a different orientation than those corresponding to existing models, when it is determined that the "best model" matching score exceeds the predefined threshold (the "Yes" prong of block 555), the current signature may be stored as an additional model (block 560). After the current signature is stored as an additional model or if the "best model" matching score for the current signature is less than the predefined threshold (the "No" prong of block 555), image frame data may be received for a subsequent image frame (block 505) and the process may be repeated. In one embodiment, when a new mage frame is evaluated, the "best model" values for the horizontal and vertical translations and the matching score may be re-initialized by setting the translation values to zero and the matching score to a high value. In accordance with operation 500, the location of a machine-readable object may be tracked without performing a computationally expensive object detection operation for each image frame.

Figure 7:
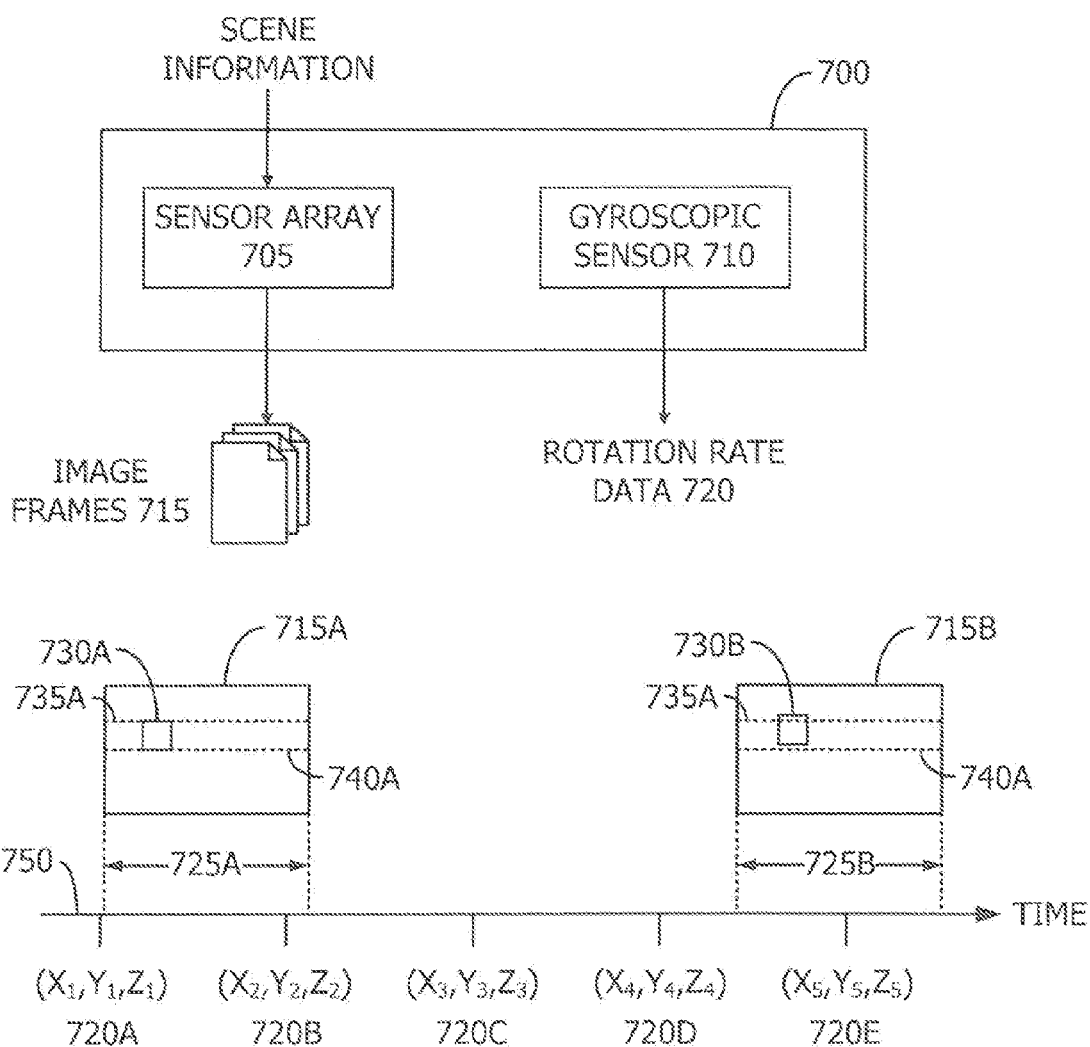
FIG. 7 illustrates a block diagram representing a device configured to capture image frame data and motion data in accordance with one embodiment.

An alternate and/or complementary tracking operation to tracking operation 500 may rely on motion sensor data that is associated with captured image frames. Devices that include image capture components such as digital cameras, smartphones, and tablet devices often additionally include motion sensors such as accelerometers and/or gyroscopes. Referring to FIG. 7, for example, device 700 includes sensor array 705 and gyroscopic sensor 710. Sensor array 705 may capture image scene information and output image frames 715 that include data representing the captured scene information. Sensor array 705 may capture black and white or color images and use, for example, complementary metal-oxide semiconductor (CMOS) or charged-coupled device (CCD) technology. Gyroscopic sensor 710 may be used to generate rotation rate data in three dimensions (e.g., (x, y, z) or (pitch, roll, yaw) or in a quaternion system). Gyro sensor 710 may use any desired technology such as micro-electro-mechanical systems (MEMS) technology. As illustrated in timeline 750, sensor array 705 and gyro sensor 710 may operate asynchronously. That is, gyro sensor 710 may continuously capture rotation rate data 720 independent of the capture of image frames 720 by sensor array 705. Consequently, image frames 720 and rotation rate data 720 may need to be correlated. Perhaps more precisely in terms of the present application, rotation rate data 720 should be correlated with the capture time of a particular portion of an image associated with the region of interest. While rotation rate data 720 may provide instantaneous motion data, the capture of a single image frame 715 may be associated with a non-negligible (in terms of a region of interest tracking operation) duration (e.g., 725A, 725B, etc.) that includes an exposure time during which individual photo cells of sensor array 705 are exposed to and collect light as well as a readout time during which data is retrieved from the individual photo cells of sensor array 705. In terms of the present application, the readout time may be significant in that many types of image capture devices utilize a rolling shutter technique whereby different image rows are captured at different times. For example, beginning portion of region of interest 730A (735A) of image frame 715A may be captured at a slightly different time than ending portion of region of interest 730A (740A). Although region of interest 730B of image frame 715B is slightly offset from region of interest 730A (e.g., due to intentional or unintentional motion of the image capture device) of image frame 715A, as will be described in greater detail below, the precision and accuracy of a tracking operation that employs rotational rate data 720 can be improved by correlating the rotational rate data 720 for a current image frame with image capture times corresponding to the location of the region of interest from a previous frame (e.g., track the location of ROI 730B using beginning and ending portions of ROI 730A). The region of interest location can then be adjusted such that a subsequent frame can use the updated region of interest location.

Because machine-readable objects are usually static, the frame-to-frame motion of a machine-readable object may typically be associated primarily with the unintentional (e.g., hand shaking) or intentional motion of an image capture device. Consequently, a tracking operation that employs motion sensor data for the image capture device may provide an accurate estimate of the change in location of a machine-readable object across image frames. Moreover, a motion data-based tracking operation may be computationally less expensive than even an image data-based tracking operation (e.g., tracking operation 500). Because a motion data-based tracking operation accounts only for the motion of an associated image capture device and not the motion of a machine-readable object, the results of such an operation may be periodically verified by performing an object detection operation or an image data-based tracking operation.

Figure 8:
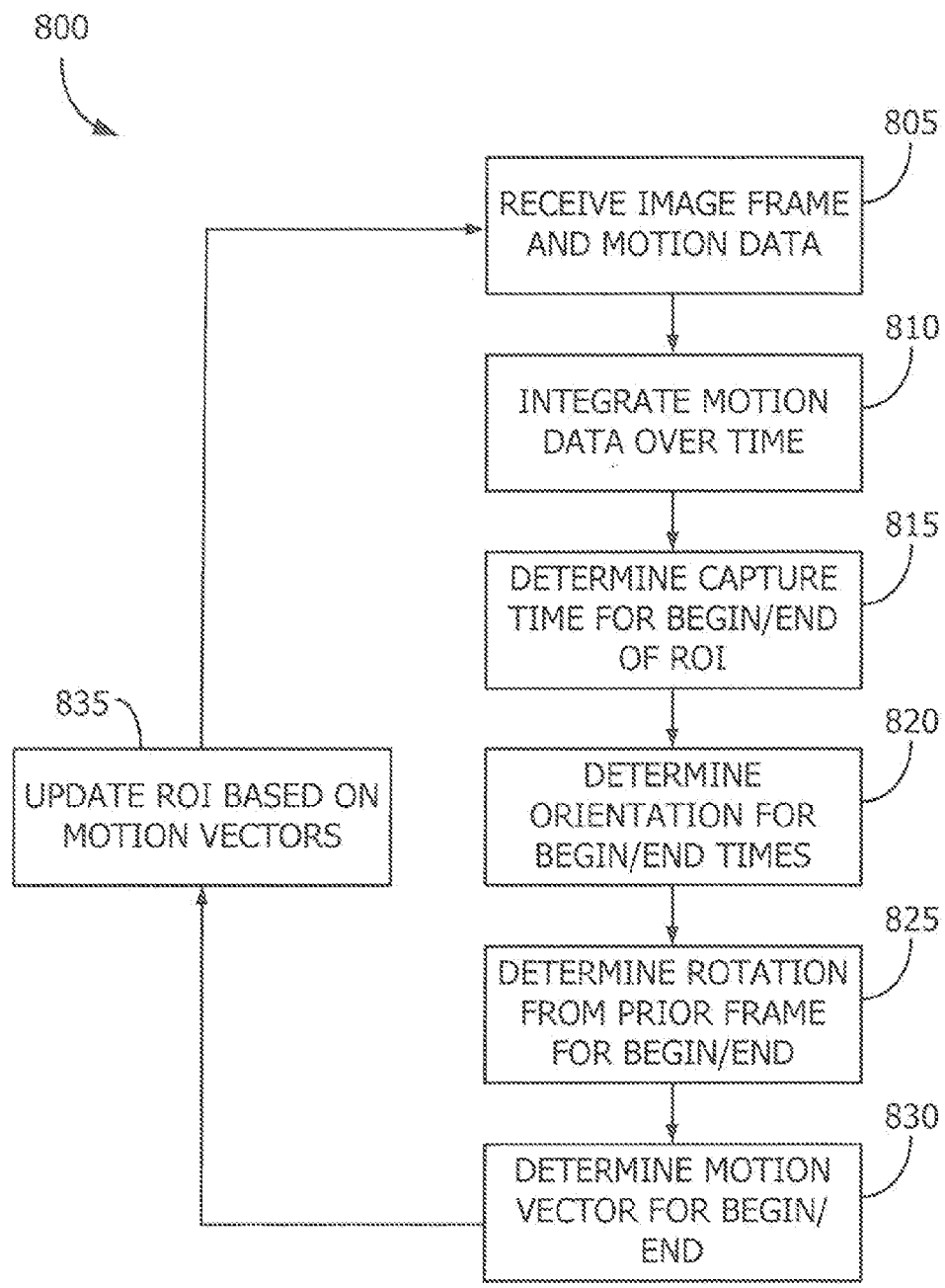
FIG. 8 illustrates a motion data-based machine-readable object tracking operation in accordance with one embodiment.

Referring to FIG. 8, tracking operation 800 may utilize image frame and motion sensor data (e.g., image frames 715 and rotation rate data 720) to track the location of a machine-readable object represented in the image frame data (block 805). Tracking operation 800 may employ many of the steps that are disclosed in application Ser. No. 13/490, 326, filed Jun. 6, 2012 and entitled "Motion-Based Image Stitching," the contents of which are incorporated herein by reference. As will be described below, the change in location of a region of interest that contains a machine-readable object may be based on an initial location of a region of interest in a prior image frame, motion sensor data associated with the prior image frame, and motion sensor data associated with a current image frame. That is, the location of a region of interest within a current image frame may be determined based on motion sensor data associated with the current image frame relative to motion sensor data associated with a prior image frame.

As described above, a gyroscopic sensor produces rotational rate information (i.e., the rate at which the image capture device is being moved in each of, for example, 3 axes). Rotational rate information may be integrated (block 810) to produce instantaneous rotation position information (e.g., also in each of 3 axes).

As was additionally described above, a single image frame may be associated with a non-instantaneous capture time. More specifically, different portions of an image frame may be associated with different capture times. In order to more precisely track the location of a region of interest that contains a machine-readable object in an image frame, the capture times for a beginning and an ending portion of the region of interest may be determined (block 815). The beginning and ending portions of a region of interest may correspond to a readout direction employed by a rolling shutter mechanism. For example, where image data is read from an image sensor from top to bottom, a beginning portion of a region of interest may correspond to a top row of pixels for the region of interest and an ending portion of the region of interest may correspond to a bottom row of pixels for the region of interest. The beginning and ending portions of a region of interest may be determined from a known location of the region of interest in a prior image frame. For example, the location of a region of interest that contains a machine-readable object in a prior frame may be specified in terms of pixel coordinates determined by an object detection operation or a tracking operation. Using the known location of a region of interest from a prior image frame, the capture times for portions of a current image frame corresponding to the beginning and ending portions of the region of interest may be determined. Referring back to FIG. 7, for example, to determine the location of region of interest 730B in image frame 715B, the capture times for a row of pixels corresponding to location 735A and for a row of pixels corresponding to location 740A may be determined. In an embodiment that uses a rolling-shutter image capture technique, the capture time for a particular portion of an image may be determined as:

$$t_i = t_0 + \frac{ET}{2} + i\left(\frac{RT}{h}\right) \tag{6}$$

where $t_i$ is the capture time of an $i^{th}$ pixel row, $t_0$ is the timestamp corresponding to the beginning capture time for the image frame, ET is the image frame exposure time, RT is the image frame readout time, and h is the height of the image frame in pixels. Given a pixel row for the beginning and ending portions of the region of interest, the capture time can be determined from the above equation. While a specific equation has been provided for the calculation of the image capture times associated with a region of interest, it will be understood that the calculation of such values may be specific to the operations of a specific image capture device. Consequently, the determination of the capture times associated with a region of interest may vary for different image capture devices.

Using the determined capture times for the beginning and ending portions of the region of interest for a current image frame, the image capture device orientations (i.e. rotational positions) corresponding to these times may be determined (block 820). The device orientations for the determined capture times may be determined by interpolating the integrated rotational rate information. That is, the integrated rotational rate information provides rotational position information that is associated with a particular timestamp. Using two or more of these rotational position data points and the timestamps associated with these points, the rotational position corresponding to the determined beginning and ending portion capture times can be determined using known interpolation techniques.

Using the orientation information corresponding to the beginning portions of the region of interest for the current image frame and the prior image frame, the rotation between the two frames may be determined. Likewise, using the orientation information corresponding to the ending portions of the region of interest for the current image frame and the prior image frame, the rotation between the two frames may be determined (block 825). The inter frame rotation for the beginning and ending portions may each be expressed as a 3×3 matrix denoted as $[R_{pc}]$. The 3×3 matrix may represent the rotated position of three unit vectors $(\hat{u}, \hat{v}, \hat{w})$ that form an orthonormal basis. More specifically, each element of rotation matrix $[R_{pc}]$ may represent one coordinate that describes the rotated position of one of the unit vectors in terms of a non-rotated, reference set of coordinate axes. Therefore, the rotation matrix may be expressed as:

$$[R_{pc}] = \begin{bmatrix} \hat{u}_x & \hat{v}_x & \hat{w}_x \\ \hat{u}_y & \hat{v}_y & \hat{w}_y \\ \hat{u}_z & \hat{v}_z & \hat{w}_z \end{bmatrix} \quad (7)$$

where each column of the rotation matrix may be described as a rotation vector and where each element of a rotation vector represents a coordinate of the rotation vector in terms of a three-dimensional reference coordinate system.

As will be understood by those of ordinary skill in the art, there are several ways to calculate rotation matrix $[R_{pc}]$ given the rotational position associated with the current and prior images. Moreover, given this position information for two consecutive images, the elements of rotation matrix $[R_{pc}]$ (e.g., the scalar component coordinates for unit vectors $\hat{u}$, $\hat{v}$, and $\hat{w}$) may be calculated independently. By way of example, where the relative rotation between the current and prior images is described by a quaternion (i.e. a normalized four element vector expressed as $\hat{q} = [q_1 \ q_2 \ q_3 \ q_4]^T$), in one embodiment the individual elements of rotation matrix $[R_{pc}]$ may be defined as:

$$[R_{pc}] = \begin{bmatrix} -1 + 2q_1^2 + 2q_4^2 & 2(q_1q_2 - q_3q_4) & 2(q_1q_3 + q_2q_4) \\ 2(q_1q_2 + q_3q_4) & -1 + 2q_2^2 + 2q_4^2 & 2(q_2q_3 - q_1q_4) \\ 2(q_1q_3 - q_2q_4) & 2(q_1q_4 + q_2q_3) & -1 + 2q_3^2 + 2q_4^2 \end{bmatrix}. \quad (8)$$

Using the determined rotation between the current image frame and the prior image frame, motion vectors that describe the two-dimensional translation of corresponding image points from the prior image frame to the current image frame may be determined for each of the beginning and ending portions (block 830). In order to calculate each of the motion vectors, the focal length (f) (i.e. the distance between the sensor and lens center) associated with the current image frame may be determined. Because image parameter values (such as the focal length) may be part of the data associated with an image, determining the focal length associated with the current image may simply involve extracting this parameter from image metadata associated with the current image. Given rotation matrix $[R_{pc}]$ and focal length f, the components of the motion vectors for the beginning and ending portions may be determined.

The determined motion vectors may include components that describe the horizontal and vertical translations of the region of interest from the prior it age frame to the current image frame, $\Delta x$ and $\Delta y$ respectively. The horizontal component of each motion vector (i.e. the scalar projection of the motion vector onto a horizontal axis) may be obtained from rotation matrix $[R_{pc}]$ and the focal length as:

$$\Delta x = f \times \left( \frac{\hat{w}_x}{\hat{w}_z} \right) \quad (9)$$

where f represents the focal length of the image capture device during the capture of the current image frame, and rotation vectors $\hat{w}_x$ and $\hat{w}_z$ are as discussed above with respect to EQ. 7. In similar fashion, the vertical component of each motion vector (i.e. the scalar projection of the motion vector onto a vertical axis orthogonal to the horizontal axis) may be determined as:

$$\Delta y = f \times \left( \frac{\hat{w}_y}{\hat{w}_z} \right) \quad (10)$$

where f represents the focal length of the image capture device during the capture of the current image frame, and rotation vectors $\hat{w}_y$ and $\hat{w}_z$ are as discussed above with respect to EQ. 7. Using the determined motion vectors for the beginning and ending portions of the region of interest, the region of interest location may be adjusted (block 835). In one embodiment, the horizontal components for the beginning and ending portion motion vectors may be averaged and the vertical components for the beginning and ending portion motion vectors may be averaged to obtain a combined motion vector with a combined horizontal component and a combined vertical component. In such an embodiment, the horizontal location of the region of interest may be adjusted by the combined horizontal component and the vertical location of the region of interest may be adjusted by the combined vertical component. However, in other embodiments, the motion vectors for the beginning and ending portions may be utilized to adjust the region of interest in other manners. In one embodiment, updating the region of interest based on the motion vectors may additionally involve determining capture time parameters for the beginning and ending portions of the updated region of interest and determining the image capture device orientation for the beginning and ending portions of the updated region of interest such that these values may be used for determination of the location of a region of interest in a subsequent image frame. The disclosed stable scene, scene change, and machine-readable object tracking operations improve upon existing machine-readable object detection and tracking operations in terms of improved robustness (where detector may not detect a machine-readable object, tracking operations may identify the location), increased efficiency (based on the decreased usage of computationally intensive detection operations), and decreased latency (by accounting for global scene changes between the time an image frame is submitted to an object detector and the time an object is detected in the image frame).

Figure 9:
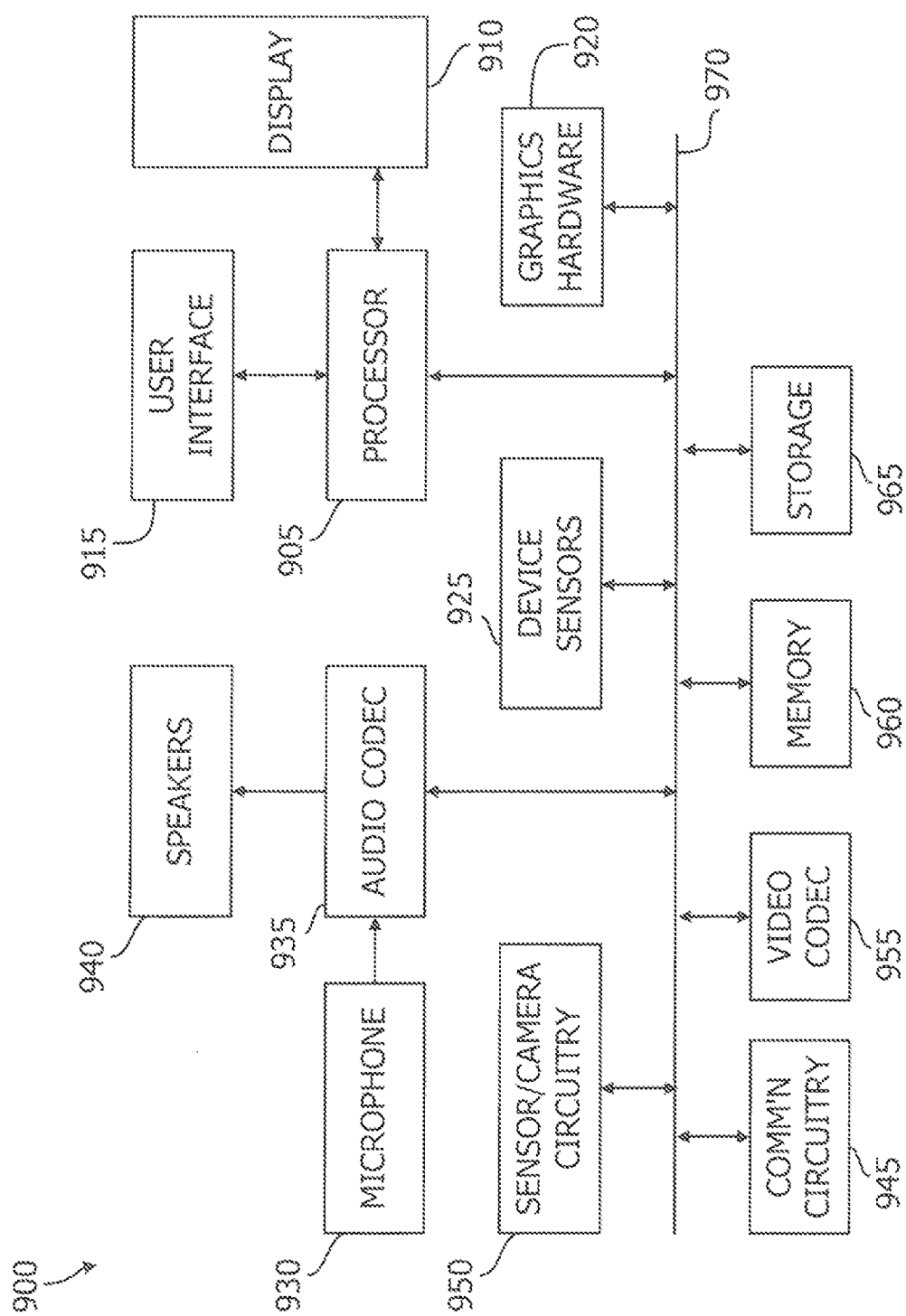
FIG. 9 shows an illustrative electronic device in accordance with one embodiment.

Referring to FIG. 9, a simplified functional block diagram of illustrative electronic device 900 is shown according to one embodiment. Electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, digital image capture unit 950, video codec(s) 955, memory 960, storage 965, and communications bus 970. Electronic device 900 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 900.

Processor 905 may execute instructions necessary to carry out or control the operation of many functions performed by device 900. Processor 905 may, for instance, drive display 910 and receive user input from user interface 915. User interface 915 can take a variety of forms, such as a button, keypad, dial, a click wheel, keyboard, display screen and/or a touch screen. Processor 905 may also, for example, be a system-on-chip such as those found in mobile devices and include a dedicated graphics processing unit (GPU). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 to process graphics information. In one embodiment, graphics hardware 920 may include a programmable graphics processing unit (GPU).

Sensor and camera circuitry 950 may capture still and video images that may be processed, at least in part, in accordance with the disclosed techniques by video codec(s) 955 and/or processor 905 and/or graphics hardware 920, and/or a dedicated image processing unit incorporated within circuitry 950. Images so captured may be stored in memory 960 and/or storage 965. Memory 960 may include one or more different types of media used by processor 905 and graphics hardware 920 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to tangibly retain computer program instructions or code organized into one or more modules and written in any desired computer programming language. When executed by, for example, processor 905 such computer program code may implement one or more of the operations described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising computer-readable instructions stored thereon, which when executed by one or more processors, cause the one or more processors to:
receive a set of image frames;
analyze a first subset of image frames of the set of image frames to determine that at least one of the first subset of image frames satisfies one or more criteria;
analyze image data in at least one second image frame of a second set of image frames to detect a location of a machine-readable object in the at least one second image frame in response to determining that at least one of the first subset of image frames satisfies the one or more criteria, wherein the machine-readable object corresponds to either a one-dimensional or a two-dimensional spatial structure, and wherein the second set of image frames is received after the first set of image frames;
identify a location of the machine-readable object in at least one third image frame in a third set of successively received image frames, the identification based, at least in part, on the-detected location of the machine-readable object in the at least one second image frame and on a translation metric between the at least one second image frame and the third set of image frames;
determine a signature based, at least in part, on image data in the at least one third image frame that corresponds to the location of the machine-readable object in the at least one second image frame;
align the signature with one or more models; and
identify one of the one or more models that is best aligned with the signature.

2. The non-transitory program storage device of claim 1, wherein the instructions to cause the one or more processors to analyze the first subset of image frames comprise instructions to cause the one or more processors to analyze the one or more criteria from at least one of a sharpness and a stability of a scene depicted in the first subset of image frames.

3. The non-transitory program storage device of claim 2, wherein the instructions to cause the one or more processors to analyze the sharpness of a scene depicted in the first subset of image frames comprise instructions to cause the one or more processors to evaluate metadata that represents auto-exposure or auto-focus settings associated with the first subset of image frames.

4. The non-transitory program storage device of claim 1, wherein the instructions to cause the one or more processors to identify a location of the machine-readable object in the at least one third image frame comprise instructions to cause the one or more processors to determine the translation metric for at least two sequentially captured image frames from the second set of image frames to the third set of image frames.

5. The non-transitory program storage device of claim 4, wherein the instructions to cause the one or more processors to identify the location of the machine-readable object in the at least one third image frame further comprise instructions to cause the one or more processors to aggregate a plurality of translation metrics for the at least two sequentially captured image frames.

6. The non-transitory program storage device of claim 1, wherein the instructions comprise instructions to cause the one or more processors to:
determine a horizontal and vertical translation from the location of the machine-readable object in the at least one second image frame to the location of the machine-readable object in the fourth image frame based, at least in part, on the one of the one or models that is best aligned with the signature.

7. The non-transitory program storage device of claim 1, wherein the signature and the one or more models each comprise a set of values corresponding to a plurality of rows of pixels and a set of values corresponding to a plurality of columns of pixels corresponding to the machine-readable object.

8. The non-transitory program storage device of claim 7, wherein the instructions to cause the one or more processors to align the signature with one or more models comprise instructions to cause the one or more processors to:
compare each of the signature sets of values to each of the corresponding sets of values of the one or more models at each of a plurality of shifted positions of the signature set of values relative to corresponding sets of values of the one or more models;

determine a matching cost as a function of the shifted positions for each of the signature sets of values with respect to each of the corresponding sets of values of the one or more models; and identify, for each of the sets of values of the one or more models, the shifted position that minimizes the matching cost.

9. The non-transitory program storage device of claim 8, wherein the instructions to cause the one or more processors to identify one of the one or more models that is best aligned with the signature comprise instructions to cause the one or more processors to:

generate a combined matching cost for each of the one or more models from the matching costs that correspond to the identified shifted position for each of the sets of values for the model; and identify the one of the one or more models having a lowest combined matching cost.

10. The non-transitory program storage device of claim 1, wherein the instructions to cause the one or more processors to determine a horizontal and vertical translation comprise instructions to cause the one or more processors to determine the horizontal and vertical translations based, at least in part, on the shifted positions corresponding to each of the sets of values for the one of the one or more models that is best aligned with the signature.

11. The non-transitory program storage device of claim 1, wherein the instructions to cause the one or more processors to identify the location of the machine-readable object in the third image frame comprise instructions to cause the one or more processors to:

receive a set of motion data associated with an image capture device that captured the set of image frames;

associate first motion data from the set of motion data with the at least one second image frame;

associate second motion data from the set of motion data with the at least one third image frame; and determine the location of the machine-readable object in the at least one third image frame based, at least in part, on a relationship between the first and second motion data.

12. The non-transitory program storage device of claim 11, wherein the instructions to cause the one or more processors to associate second motion data from the set of motion data with the fourth at least one third image frame comprise instructions to cause the one or more processors to:

determine a capture time associated with a portion of the at least one third image frame that corresponds to the location of the machine-readable object in the at least one second image frame; and associate motion data that corresponds to the determined capture time with the third image frame.

13. The non-transitory program storage device of claim 11, wherein the instructions to cause the one or more processors to identify the location of the machine-readable object in the fourth at least one third image frame comprise instructions to cause the one or more processors to:

determine a relative rotation between the at least one second image frame and the at least one third image frame based, at least in part, on the first and second motion data;

identify a focal length associated with the at least one third image frame; and determine a motion vector that specifies a change in location of the machine-readable object from the at least one second image frame to the at least one third image frame based, at least in part, on the relative rotation and the focal length.

14. A method, comprising:

receiving, using one or more processing devices, a set of image frames;

analyzing, using the one or more processing devices, a first subset of image frames in the set of image frames to determine that at least one of the first subset of image frames satisfies one or more criteria;

analyzing, using the one or more processing devices, image data in at least one second image frame of a second set of image frames in response to determining that the at least one of the first subset of image frames satisfy the one or more criteria, wherein the machine-readable object corresponds to either a one-dimensional or a two-dimensional spatial structure, and wherein the second set of image frames is received after the first subset of image frames;

detecting, using the one or more processing devices, a location of the machine-readable object in the at least one second image frame of the second set of image frames in response to analyzing the image data in the at least one second image frame of the second set of image frames; and tracking, after the detection of the location of the machine-readable object in the at least one second image frame and using the one or more processing devices, the location of the machine-readable object in a third set of successively captured image frames captured after the second set of image frames based, at least in part on one or more frame-to-frame translation metrics;

determining a signature based, at least in part, on image data for a third image frame of the third set of image frames that corresponds to the detected location of the machine-readable object in the at least one second image frame;

aligning the signature with one or more models;

identifying one of the one or more models that is best aligned with the signature.

15. The method of claim 14, wherein the act of analyzing the first subset of image frames comprises analyzing the one or more criteria from at least one of a sharpness and a stability of a scene depicted in the first subset of image frames.

16. The method of claim 14, wherein the act of tracking the location of the machine-readable object in the third set of image frames comprises evaluating image data to determine the frame-to-frame translation metrics.

17. A system, comprising:

an image capture component;

a memory; and one or more processors operatively coupled to the memory and the image capture component and configured to execute program code stored in the memory to cause the one or more processors to:

receive a set of image frames captured by the image capture component;

analyze a first subset of image frames in the set of image frames;

determine that at least one of the first subset of image frames satisfies one or more criteria;

analyze, in response to the determination, image data in at least one second image frame in a second set of image frames to detect a machine-readable object that corresponds to either a one-dimensional or a two-dimensional spatial structure, wherein the second set of image frames is captured after the first set of image frames;

monitor, coincident to the detecting, the second set of image frames for a change in the one or more criteria; and identify a location of the machine-readable object in at least one third image frame in a third set of successively captured image frames based, at least in part, on a detected location of the machine-readable object in at least one second image frame and on a translation metric between the at least one second image frame and the third set of image frame;

determine a signature based, at least in part, on image data for the at least one third image frame;

align the signature with one or more models;

align one of the one or more models that is aligned with the signature.

18. The system of claim 17, wherein the program code to cause the one or more processors to identify the location of the machine-readable object in the at least one third image frame comprises program code to cause the one or more processors to:

determine a horizontal and vertical translation of the machine-readable object between the at least one second image frame and the at least one third image frame based, at least in part, on the one of the one or models that is aligned with the signature.

19. The system of claim 17, wherein the program code to cause the one or more processors to identify the location of the machine-readable object in the at least one third image frame comprises program code to cause the one or more processors to:

receive a set of motion data from a motion sensor;

associate first motion data from the set of motion data with one of the second image frames;

associate second motion data from the set of motion data with the at least one third image frame; and determine the location of the machine-readable object in the at least one third image frame based, at least in part, on a relationship between the first and second motion data.

* * * * *

UNITED STATES PATENT AND TRADEMARK OFFICE
CERTIFICATE OF CORRECTION

PATENT NO. : 9,542,585 B2  Page 1 of 1
APPLICATION NO. : 13/911983
DATED : January 10, 2017
INVENTOR(S) : George Williams et al.

It is certified that error appears in the above-identified patent and that said Letters Patent is hereby corrected as shown below:

Column 18, Line 53: delete the word "fourth" and insert the word --third--;

Column 18, Line 54: insert the word --more-- before the word "models";

Column 19, Line 49: delete the word "fourth";

Column 19, Line 60: delete the word "fourth";

Column 21, Line 4: delete the word "set" and insert the word --subset--;

Column 21, Line 15: delete the phrase "third set of image frame" and insert the phrase --third set of image frames--;

Column 22, Line 7: insert the word --more-- before the word "models".

Signed and Sealed this
Twentieth Day of June, 2017

Joseph Matal
*Performing the Functions and Duties of the
Under Secretary of Commerce for Intellectual Property and
Director of the United States Patent and Trademark Office*